May 26, 1964  H. A. VOGEL ETAL  3,134,682
SANITARY COATINGS COMPOSITIONS
Filed Feb. 1, 1960
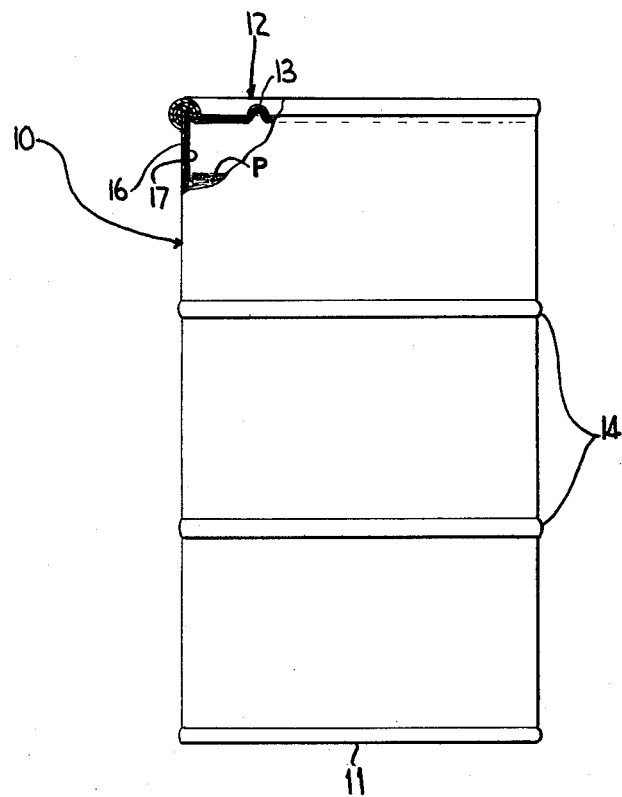
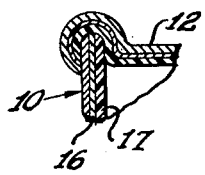
INVENTORS
GENE GEREK and
HENRY A. VOGEL
BY Oscar H. Spencer
ATTORNEY United States Patent Office 3,134,682
Patented May 26, 1964

3,134,682
SANITARY COATINGS COMPOSITIONS
Henry A. Vogel, Gibsonia, and Gene Gerek, Trafford, Pa., assignors to Pittsburgh Plate Glass Company, a corporation of Pennsylvania
Filed Feb. 1, 1960, Ser. No. 5,756
7 Claims. (Cl. 99—181)

This invention relates to coatings compositions capable of forming protective coatings upon the surfaces of tin plates and other metals from which diverse containers and similar articles may be fabricated, and it has particular relation to sanitary coatings compositions for use in the fabrication of containers employed in the packaging of food products, and notably of such food products as meats containing fatty acid esters, fatty acids, salt, and similar materials usually associated with meat products.

In the coating of containers, such as conventional tin cans, packagers of meat products having utilized coating compositions referred to as "C" enamels. Although such special coatings have provided an improved container for some meat products, organic coatings for containers have not been universally accepted for use in the packaging of most meat products containing fatty acids. Accordingly, intensive research has long been conducted to improve the formulation of sanitary coatings for such foods. The problem is to utilize various ingredients in such proportions that performance and cost characteristics can be improved without sacrificing other properties which are also essential, or at least important.

A sanitary coating composition for the foregoing uses must have characteristics adapting it to be applied uniformly, have sufficient bond and flexibility after baking, to retain its adherence and continuity when the article is deformed as, for instance, in the stamping of can ends from flat, precoated sheets of metal. Sanitary coating compositions for use upon containers for meat packages must also be relatively impervious to fatty acids, esters, salt, and similar materials which are often present in meat products. The coatings must remain protective to the metal, even during and after processing at 250° F. They must also be resistant to objectionable changes of color as, for instance, darkening during processing, and for reasonable periods of storage of the packages. In some instances, it is desirable that the coatings compositions be sufficiently resistant to scorching as to permit the joints of the containers having the coatings to be soldered without objectionable changes in the contiguous coating compositions.

In accordance with the provisions of this invention, there have been obtained compositions capable of being spread on sheet metal, such as tin plate, and baked to give a coated sheet which can be fabricated into containers without loss of adhesion and film integrity. The resultant containers are capable of withstanding processing at 250° F. without film degradation, such as loss of adhesion and discoloration, and are free from any ingredients which might impart toxicities to the packaged material. These desirable results are obtained by incorporating with coatings compositions, the vehiclular portions of which may be the same as or similar to those in a "C" enamel, a system of pigmentary materials comprising as their essential component a mixture or blend of flake aluminum and iron oxide.

A container having such linings is illustrated in the drawing, in which the FIGURE 1 is an elevational view but with parts broken away to show the linings and FIGURE 2 is a fragmentary cross-section on a larger scale, and in which said linings are prepared in accordance with the principles of this invention.

The container, as shown, comprises a cylindrical side wall 10, a bottom 11 and a top 12. The bottom and top may be formed with circular corrugations, as indicated at 13, and the side wall may also be formed with one or more peripheral beads, as at 14. The inner surfaces of the container are provided with a thin coating of tin, as at 16, and a liner, as at 17, of an oleoresin varnish which is pigmented with a mixture of flake aluminum and iron oxide to give stain resistance, good fabrication characteristics and other desired properties. The contents, such as a pack of meat containing fats, is shown at P.

In order to demonstrate the efficacy of such pigmentary systems in a sanitary liner for containers of meat products, two vehicles were prepared. One of these, designated as vehicle A, was an oleoresin varnish and comprised:

VEHICLE A

| | Parts by weight |
|---|---|
| Oil soluble phenol-formaldehyde resin | 45.8 |
| Linseed oil | 21.7 |
| Dehydrated castor oil | 21.7 |
| Soybean oil | 10.8 |

To this vehicle was added a mixture of driers comprising 0.08 percent by weight based upon resin solids of manganese as manganese naphthenate and 0.01 percent upon a like basis of iron as iron linoresinate.

The oil soluble phenol-formaldehyde resin was an Amberol sold by Rohm and Haas as M-88. This is a rosin modified phenol-formaldehyde containing alkyl and aryl side chains of the benzene ring. It has a capillary tube melting point of 145° C. to 155° C.

The several components were cold blended in well-known manner. The components could also be blended while hot, if so desired.

VEHICLE B

The major component of this vehicle is an interpolymer of:

| | Parts by weight |
|---|---|
| Linseed oil | 57.2 |
| Dicyclopentadiene | 42.8 |

These components were interpolymerized under heat and pressure in well-known manner to provide a resin which was dissolved in aliphatic mineral spirits at a vehicular solids concentration of 60 percent.

The minor component of vehicle B was prepared from a mixture of oil-soluble, non-heat reactive phenol-formaldehyde resin, linseed oil and tung oil in the following proportions:

| | Parts by weight |
|---|---|
| Phenol-formaldehyde resin | 38 |
| Linseed oil | 46.2 |
| Tung oil | 16 |

This mixture was cooked in aliphatic mineral spirits at a concentration of 50 percent by weight.

The two components were then blended in a ratio of 90 percent by weight of the first and 10 percent upon a like basis of the second, and to the blend was added a drier, namely, 0.002 percent upon the basis of the resin solids of iron as iron resinate.

Iron resinate is optional. It could also be replaced by other driers, such as the oleates, linoleates and naphthenates of such drier metals as iron, lead, cobalt and nickel, or the resinates of lead, cobalt and nickel, and others. The phenolic modified resin may be eliminated if desired.

These vehicles (A and B) were then pigmented to provide the following coating compositions:

Example I

The material of vehicle A was mixed with 15 percent by weight based upon the resin solids of zinc oxide.

Example II

Vehicle corresponding to Vehicle B was also pigmented with 15 percent by weight based upon the vehicle of zinc oxide. The materials of Examples I and II may be regarded as controls.

Example III

In this example a paste was prepared in which the vehicle was prepared in accordance with the provisions of Vehicle B, this paste being pigmented in accordance with this invention with flake aluminum and iron oxide, the formulation being as follows:

PASTE 1

| | Parts by weight [2] |
|---|---|
| Iron oxide [1] | 22.4 |
| Leaf-free flake aluminum | 37.6 |
| Dicyclopentadiene-linseed oil interpolymer | 40.0 |

[1] Lemon yellow hydrated iron oxide, 86 percent $Fe_2O_3$.
[2] The units of weight are the same as in Vehicles A and B.

This paste in an amount of 10.5 percent by weight based upon total resin solids in the films was added to vehicle B to provide a pigmented sanitary liner.

Example IV

In this example the vehicle of the pigment paste was prepared in accordance with Vehicle A, the pigmentation of the paste being in accordance with the provisions of this invention, with flake aluminum and iron oxide.

The formulation of the paste was as follows:

PASTE 2

| | Parts by weight |
|---|---|
| Iron oxide* | 22.4 |
| Leaf-free flake aluminum | 37.6 |
| Oleoresin varnish (Vehicle A) | 40.0 |

*Lemon yellow hydrated iron oxide, 86 percent $Fe_2O_3$.

The paste was added to Vehicle A in an amount of 10.5 percent by weight based upon total resin solids in the films.

The foregoing coatings compositions of Examples I–IV were roll coated upon tin plate metal of a grade corresponding to that employed in the fabrication of conventional tin cans to provide films having a film weight of 5–6 milligrams per square inch, and were baked for 8–10 minutes at an oven temperature of about 400–415° F. The films were of a pleasing yellowish color. Coated can end blanks were die stamped from the sheet metal and the resultant bottom closures obtained were double-seamed to the tubular wall portions of tin cans. After the containers to be tested had been filled with the test medium in the manner to be described, the top end closures were also double-seamed to the cylindrical bodies with seam sealing compound completely to hermetically seal the containers as shown in the drawing.

In testing the coatings, a pork-soya composition conventionally employed in testing linings for containers for meat products and comprising:

| | Parts by weight |
|---|---|
| Soya-fatty acids | 10 |
| Soya oil | 90 | was used.

These components were warmed before weighing and mixing. The mixture was of an acid value of about 20.

In the filling of the containers for test purposes, each can was approximately half-filled with fresh ground pork shoulder and the soya oil-fatty acid mixture preheated to a temperature of 200° F. was filled into the container in a ratio of 2.6 milliliters of the mixture per ounce of pork shoulder in the container. When the desired amount of mixture had been added, the container was filled to within ¼ inch of the top with added pork shoulder. The containers were closed and processed at a temperature of 250° F. for a period of 90 minutes. The processing followed conventional techniques in such operations.

At the conclusion of the processing period, the containers were opened and the can ends were washed, dried, and were examined for hardness, staining, loss of adhesion and fabrication characteristics of the end blanks. The tests included: (1) a fingernail hardness test, which when performed by an experienced person is highly significant; (2) a Scotch tape test in which the films were also scratched or scored with a sharp instrument and pieces of Scotch tape were pressed thereupon and removed to observe removal of the coatings by the tape; and (3) a fabrication test in which the fabrication characteristics of the films were observed by subjecting the blanks to immersion in an acidic copper sulfate solution for 5 minutes to observe the permeation of the copper sulfate through the films. The penetration of the solution with resultant deposition of copper on the substrate is an indication of failure of the films in the stamping or fabricating operation. Such staining is especially likely to occur at shoulders and corrugations in the films where the coated metal is severely stressed or deformed.

The following tabular data constitute the results of the tests:

TABLE I

| Vehicle description | Pigmentation | Process in Pork-Soya, 90' at 250° F., Film Characteristics | | | Can-end Fabrication |
|---|---|---|---|---|---|
| | | | Test (1) | Test (2) | Test (3) |
| Oleoresinous type (Vehicle A) | 15% zinc oxide | De-zincing | Soft | Poor adhesion | Good. |
| Oil-Copolymer (Vehicle B) | do | do | do | do | Do. |
| Do | 10.5% ferric oxide +flake aluminum | No effect | Hard | Good adhesion. | Do. |
| Oleoresinous type (Vehicle A) | do | do | do | do | Do. |

(1) Fingernail hardness.
(2) Scored and Scotch taped.
(3) Can-end fabrication plus 5 minutes in acidic copper sulfate solution.

It will be observed that in the foregoing tests the vehicles which had been pigmented with zinc oxide all showed de-zincing or solution of the pigment by the contents of the containers. The adhesion was poor and the films were soft. These vehicles, when pigmented with zinc oxide to provide conventional types of "C" enamels, were not satisfactory for coating or lining containers employed in the packaging of pork-soya mixtures. On the other hand, the compositions which had been pigmented with ferric oxide-flake aluminum systems showed good adhesion and good hardness. The can ends exhibited good fabrication characteristics, there being no appreciable penetration of the acidic copper sulfate solution at the corrugations and shoulders of the can ends. It was apparent that the vehicles which were pigmented with the mixtures of ferric oxide and flake aluminum were much superior to the vehicles which were pigmented with zinc oxide.

Tests were also performed with coatings compositions which were pigmented with flake aluminum, but the vehicles failed the fabrication tests, the films in the end blanks having poor adhesion to the metal underneath.

Such blanks were not suitable for testing with the pork-soya mixture.

Tests performed with vehicles containing ferric oxide alone as the pigmentary material likewise were found to be unsuitable for the packing of meat compositions of the above-indicated types because the coatings were severely stained by the contents of the containers. The hiding power of the ferric oxide is also poor.

In the pigmentation of the vehicles, it has been found that compositions containing about 40 parts by weight of ferric oxide to 60 parts by weight of leaf-free flake aluminum are quite satisfactory. However, it is considered that the ratio of the ferric oxide to flake aluminum may be varied within a range of 80–20 parts by weight of ferric oxide and 20-80 parts by weight of the flake aluminum. The ratio of combined pigments to vehicular solids may be within a range of about 5 percent to about 20 percent based upon the resin solids.

The foregoing vehicles are merely illustrative of those which may be used in the practice of the invention. For example, in the preparation of vehicles which can be pigmented with flake aluminum and iron oxide to provide linings for containers in accordance with the provisions of the present invention, the use of various drying oils is contemplated. However, those glyceride oils or mixtures thereof containing at least some conjugately unsaturated components are considered to be especially useful. Such oils include tung oil, dehydrated castor oil, oiticica oil, and others. Other oils of somewhat slower drying capacity comprise linseed oil, safflower oil, and the like, and may be used for at least a part of the conjugately unsaturated oil. The latter oils comprise soybean oil, cottonseed oil, and the like. The oils may be fractionated, if desired, in order to obtain concentrations of the more active glyceride components, such as the glycerides of elaeostearic acid, linoleic acid, linolenic acid, and the like. The glycerides of these acids may, if desired, be formed synthetically from the acids regardless of the source thereof. Also, it will be apparent that synthetic drying oils obtained by esterification of various polyols, such as pentaerythritol and others containing more than three hydroxyl groups in the molecule, may be used. The oils employed may be the raw oils or the refined oils obtained, for example by treating the raw oils with alkali in order to remove gums such as phosphatides. The oils may be bodied or unbodied as desired.

Gums or soluble resins which may be incorporated with the oils to provide varnishes comprise natural gums such as have already been briefly referred to, and including:

| | |
|---|---|
| Congo | East India |
| Congo ester | Dammar |
| Kauri | Accroides |
| Pontianak | Sandarac |
| Manila | Mastic |
| Boea | Elemi |
| Batu | |

These may be incorporated with the glyceride oil by cooking, cold-cutting, or other appropriate techniques.

Synthetic resins may likewise be incorporated with the oils to provide oleoresin varnishes. Appropriate synthetic resins or gums comprise those obtained by the reaction of various phenols and aldehydes, such as formaldehyde; these phenolic resins are, of course, of the well-known oil soluble type. They may be either heat reactive or non-reactive resins. They may be 100 percent phenolics or may be modified by rosin or other resins, such as are herein described for the preparation of oleoresin varnishes.

In the phenol-formaldehyde resin, phenol per se or modified phenols containing side chains replacing hydrogen in the benzene ring, may be used. Examples of modified phenols include cresol (ortho, meta or para), xylenols such as 2,4-xylenol, 3,4-xylenol, 2,2-bis(4-hydroxyphenyl)propane, p-phenylphenol, p-cyclohexylphenol, p-tertiary butyl phenol, p-tertiary amyl phenol, p-butenyl phenol, and others. Mixtures of any two or more of these phenols may be used.

Still other resins include coumarone-indene resins, terpene phenolic resins, petroleum resins resulting from the thermal cracking in the production of gasoline. The resins, natural or synthetic, may be used in varying amounts with respect to the oil, for example, to provide varnishes of short oil length, medium oil length, or long oil length. Usually, the oil length will fall within a range of about 6 to 60 gallons of oil per 100 pounds of resin.

The compositions and preparation of various oleoresin varnishes and phenol-formaldehyde resins of various types are discussed in the technical literature, for example, in the text entitled Organic Coating Technology, by Henry Fleming Payne, published by John Wiley and Sons, Inc., copyrighted in 1954. Reference may be had to this and other texts for the compositions and preparation of oleoresin varnishes and phenol-formaldehyde components therefor, suitable for use in the practice of the present invention.

Cyclopentadiene and drying oils may be interpolymerized in amounts to provide vehicles which can be used without added resin or gum. The interpolymers with or without added gums or resins may be incorporated with added oils. The compositions containing the interpolymers may be pigmented with blends of flake aluminum and iron oxide for use as lining materials for containers and for other applications.

The interpolymers may be prepared by heating appropriate mixtures of cyclopentadiene or dicyclopentadiene, or other lower homopolymers of cyclopentadiene containing, for example, up to 4 or 5 cyclopentadiene units per molecule. A preferred process comprises mixing a glyceride drying oil, such as tung oil, linseed oil, soya oil, or the like, and cyclopentadiene or its lower homopolymers, and heating the mixture under pressure in a suitable apparatus, such as an autoclave, to a temperature above that of cracking of dicyclopentadiene. In preparing the interpolymers, the proportion of cyclopentadiene or lower homopolymers thereof may vary within a range of about 5 to 80 parts by weight of the hydrocarbon to 95 to 20 parts by weight of the oil. Naturally those interpolymers containing higher percentages of cyclopentadiene tend to be more viscous or even to be solid resinous materials. These may advantageously be dissolved in a solvent, such as varnish-makers' or painters' gum, naphtha, xylene, toluene, turpentine, or the like, or may be dissolved as added gums or resins in drying oils to provide various oleoresin varnishes. Techniques for preparing homopolymers of the foregoing types for pigmentation with mixtures of flake aluminum and iron oxide are disclosed in such United States Patents as:

2,392,140
2,392,732
2,398,889
2,399,179
2,404,836

Reference may be had to these patents for disclosures of methods of preparing interpolymers useful in the practice of the present invention.

In the preparation of a coating composition suitable for lining containers in accordance with the provisions of the present invention, various proportions of pigmentary materials and oil may be employed, for example, the range of the pigments may be from about 5 parts to 20 parts per 95 parts to 80 parts of the oil. The proportions of the pigments with respect to each other are likewise variable. Ranges of about 70 parts to 20 parts of flake aluminum to 20 parts to 80 parts of iron oxide are included (parts as above given are in parts by weight).

If desired, other pigmentary materials such as zinc oxide may also be included, the amounts thereof being in a range of about 1 part to 50 parts by weight per 100 parts by weight of the flake aluminum-iron oxide combination.

In the incorporation of the pigments into the paste or the paste into the vehicle, the conventional grinding apparatus may be employed.

When the pigment combination and the vehicle have been properly ground together, the liquid mixture can be applied to surfaces to be coated, such as blanks of sheet iron or steel, by appropriate techniques such as spraying, roller coating, brushing, or the like. As previously indicated, the metal substrate is usually coated with a thin film of metallic tin, however, the practice of the invention is not limited to the use of tinned metal. In come cases, it may be desirable to apply the lining material to black metal, or to metal which has been primed with various primers or which has been anodized or otherwise treated.

We claim:

1. A metal container for comestible materials, said container having its internal surface coated with an adherent layer of a lining material consisting essentially of (1) about 95 to about 80 percent by weight of an oleoresin varnish vehicle and (2) about 5 to about 20 percent by weight of a pigment mixture of flake aluminum and iron oxide, the ratio of iron oxide to flake aluminum being in a range of about 20 to about 80 percent by weight of flake aluminum and about 80 to about 20 percent by weight of iron oxide.

2. The container of claim 1 in which said vehicle is an interpolymer of cyclopentadiene and a glyceride drying oil.

3. The container of claim 1 in which said vehicle contains a phenolic resin.

4. A metal container for comestible materials, said container having its internal surface coated with an adherent layer of a lining material consisting essentially of (1) about 95 to about 80 percent by weight of an oleoresin varnish having an oil length of 15 to 60 gallons, and (2) about 5 to about 20 percent by weight of a pigment mixture of flake aluminum and hydrated $Fe_2O_3$, the ratio of $Fe_2O_3$ to flake aluminum being in a range of about 20 to about 80 percent by weight of flake aluminum to about 80 to about 20 percent by weight of hydrated $Fe_2O_3$.

5. The container of claim 4 in which said vehicle is an interpolymer of cyclopentadiene and a glyceride drying oil.

6. The container of claim 4 in which said vehicle contains a phenolic resin.

7. A package comprising a comestible material enclosed within a metal container, said container having its internal surface coated with an adherent layer of a lining material consisting essentially of (1) about 95 to about 80 percent by weight of an oleoresin varnish vehicle and (2) about 5 to about 20 percent by weight of a pigment mixture of flake aluminum and iron oxide, the ratio of iron oxide to flake aluminum being in a range of about 20 to about 80 percent by weight of flake aluminum and about 80 to about 20 percent by weight of iron oxide.

References Cited in the file of this patent

UNITED STATES PATENTS

| | | |
|---|---|---|
| 2,392,732 | Gerhart | Jan. 8, 1946 |
| 2,456,313 | Pratt | Dec. 14, 1948 |
| 2,662,027 | Pike | Dec. 8, 1953 |
| 2,780,564 | Gray | Feb. 5, 1957 |
| 2,941,894 | McAdow | June 21, 1960 |